April 29, 1969 P. C. HARVEY 3,440,884
AMBIENT TEMPERATURE COMPENSATED THERMOCOUPLE VACUUM GAUGE
Filed June 3, 1966

3,440,884
AMBIENT TEMPERATURE COMPENSATED THERMOCOUPLE VACUUM GAUGE
Philip C. Harvey, Bedford, Mass., assignor to National Research Corporation, Newton, Mass., a corporation of Massachusetts
Continuation-in-part of application Ser. No. 523,381, Jan. 27, 1966. This application June 3, 1966, Ser. No. 555,195
Int. Cl. G01l *21/12*
U.S. Cl. 73—399                              6 Claims

ABSTRACT OF THE DISCLOSURE

Vacuum gauge comprising a thermocouple in the vacuum zone with a negative coefficient thermistor, in series with the thermocouple and exposed to ambient temperature and pressure to improve reliability of pressure readings. The gauge also comprises a crossed wire thermocouple and three wire electrical connection in the gauge circuit.

---

This application is a continuation-in-part of my copending application Ser. No. 523,381 filed Jan. 27, 1966, now Patent No. 3,397,579.

This invention relates to apparatus for measuring gas density based on the variation of heat loss from a heated thermocouple as a function of changing gas density—i.e., a vacuum gauge of the thermocouple type.

Such gauges have been a part of the vacuum technician's arsenal of measuring instruments since described in U.S. Patent 1,381,450, issued to Butterfield in 1921; U.S. Patent 1,274,635, issued to Tschudy in 1918; and U.S. Patent 1,506,003 issued to Kambayshi in 1924. It has long been recognized that such gauges are subject to error due to ambient temperature changes. However, the workers in the vacuum gauge art misunderstood the nature of the changes and adopted a compensating thermocouple scheme from the aircraft thermal anemometer art (see U.S. Patent 2,745,283 issued to Hastings in 1956). However, I have discovered that the Hastings type compensation *is inoperative as applied to a vacuum gauge.* Having recognized this problem and the fact of noncompensation in state of the art vacuum gauges, I provide a simple correction in the form of a thermistor element in circuit with the thermocouple vacuum gauge to provide true compensation and thereby advance the reliable accuracy of this type of vacuum gauge.

It is therefore the object of the invention to provide a vacuum gauge of the thermocouple type which is truly compensated for ambient temperature changes.

Other objects, features and advantages of the invention will be obvious from the following description taken in conjunction with the accompanying drawings wherein.

Figure 1:
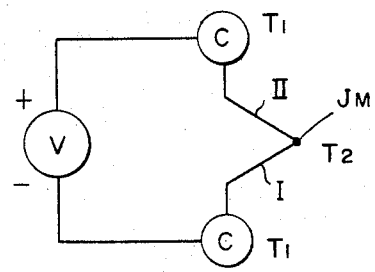
FIG. 1 is the D.C. equivalent circuit for a typical prior art thermocouple vacuum gauge without any attempt at ambient temperature compensation.

Referring to FIG. 1 there is shown a D.C. equivalent circuit of an uncompensated thermocouple gauge. The instrument has a heated junction $J_M$ with legs I and II of dissimilar materials (e.g., I being constantan and II being Nichrome), cold contacts C and a millivoltmeter V. The contacts C are at ambient temperature $T_1$ (which is used as a reference temperature) and the main junction $J_M$ is at a temperature $T_2$ determined as a function of heat input and heat output through the gas environment being measured. The voltage developed across the meter V depends on the net voltage inputs (KT) where K is the thermoelectric power of each material (microvolts per degree centigrade) and T is the temperature of the material:

(1) $V = T_1(K_I - K_C) + T_2(K_{II} - K_I) + T_1(K_C - K_{II})$

Figure 2:
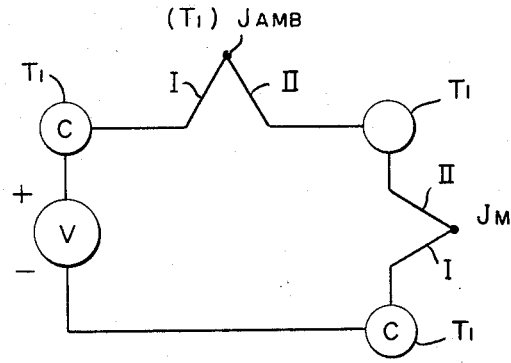
FIG. 2 is the D.C. equivalent circuit for a prior art gauge with supposed ambient compensation.

Simplifying:

(2) $V = T_2(K_{II} - K_I) + T_1(K_I - K_{II})$
$\quad\quad = (T_2 - T_1)(K_{II} - K_I)$ Now FIG. 2 shows the D.C. equivalent circuit of a supposedly ambient-compensated thermocouple gauge of the prior art. In this equivalent circuit the same elements as in the FIG. 1 equivalent circuit are shown. In addition, there is a thermocouple having its junction $J_{AMB}$ exposed to ambient temperature $T_1$. The voltage analysis of this loop for meter deflection voltage is:

(3) $V = T_1(K - K_C) + T_2(K_{II} - K_I) + T_1(K_C - K_{II})$
$\quad\quad + T_1(K_{II} - K_C) + T_1(K_I - K_{II}) + T_1(K_C - K_I)$ Simplifying:

(4) $\quad\quad V = T_2(K_{II} - K_I) + T_1(K_I - K_{II})$ which is the same as Equation 2, demonstrating the lack of any ambient compensation in such devices. A typical embodiment of the FIG. 2 circuit is shown in U.S. Patent 2,745,283 to Hastings where an ambient compensated high altitude thermocouple flowmeter is shown with an additional thermocouple providing ambient compensation. The device shown in the patent does indeed provide compensation when used in its intended context as a flowmeter wherein rapid temperature fluctuations occur in the flowing gaseous medium and the compensation is for these rather than quasi-static ambient conditions. However, the device shown in the patent has been adapted to the vacuum gauge art without consideration of the foregoing analysis (Equations 1–4) and the result has been a lack of thermal compensation which can cause variations in exces of .010 mm. Hg with variations in ambient temperature from 0° C. to 50° C. while measuring pressure on the order of .001 mm. Hg absolute. The bases of the fallacy in using the patent device in the vacuum gauge context are the assumptions that (1) a device for compensating for transient temperature changes only in the gas would also compensate for long term system temperature changes including changes in the ambient temperature of the reference junctions and (2) that the gas in a vacuum system would be at a temperature significantly different from the system including reference junctions as it may be in a flowmeter. Both these assumptions are untrue in the vacuum gauge context.

Figure 3:
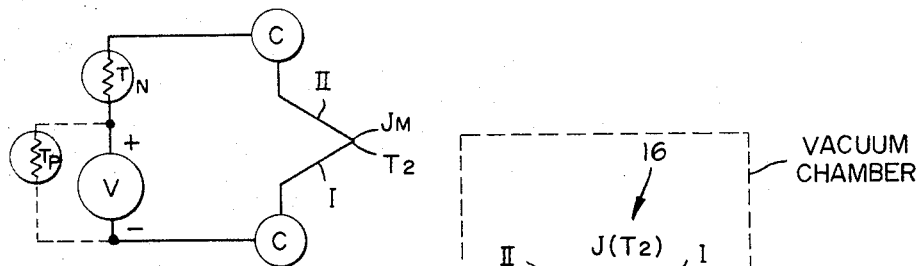
FIG. 3 is the D.C. equivalent of the present invention.

Having recognized the erroneous impression of the prior art, simple solutions are at hand. A thermistor can be incorporated in circuit with the voltmeter and exposed to the ambient temperature. The thermistor has the characteristic that its voltage drop changes as a function of temperature. This arrangement is shown in FIG. 3 where a thermistor $T_N$ with a negative coefficient is incorporated in series with the meter. In an alternative arrangement, a positive coefficient thermistor can be incorporated in parallel with the meter.

Figure 3A:
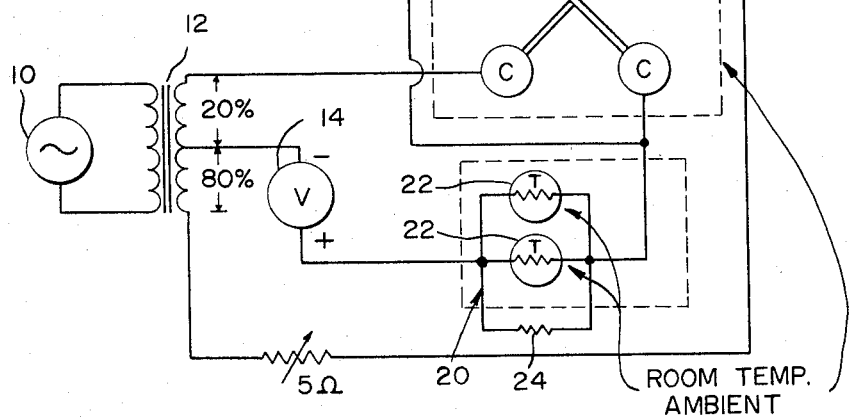
FIG. 3A is the circuit diagram of the preferred physical embodiment of the present invention.

Referring now to FIG. 3A, the preferred embodiment of the present invention is shown, the apparatus comprises an alternating current power supply 10 which may be as described in the copending application S.N. 523,381, filed Jan. 27, 1966, a transformer 12, a millivoltmeter 14, a thermocouple gauge 16, located in the vacuum zone, with a jumper wire 18 connecting two of its contacts C and a thermistor assembly 20 located in an ambient pressure-temperature zone. The thermocouple 16 comprises a pair of crossed wires I, II with a welded junction J. The wire I provides the heating at junction J and the wires I, II provide parallel thermocouples (the upper and lower halves of wire II together with the upper and lower halves of wire I). The thermistor assembly comprises a pair of Fenwal LDO2X1 thermistors 22 and a 2.2 ohm resistors 24. This assembly could be replaced by a single negative coefficient thermistor of suitable design. The elements 22 may be placed in a closed chamber formed under the socket of the thermocouple gauge 16. The jumper wire 18 can be housed in the same chamber as the thermistor elements 22.

What is claimed is:

1. A thermocouple vacuum gauge comprising at least one thermocouple with hot and cold junctions, said cold junction mounted in the vacuum zone whose vacuum level is to be measured, means for heating the hot junction, a voltmeter connected to the thermocouple for effecting readings in terms of pressure measurements and thermistor means in circuit with the voltmeter and exposed to an ambient temperature condition of the vacuum system, the thermistor means being constructed and arranged to compensate the voltmeter readings for changes in ambient temperature of the vacuum system, whereby the effects of ambient temperature on such pressure measurements are significantly reduced so that meter readings stay constant for a given pressure at varying ambient temperatures notwithstanding changes in the hot junction temperature, as well as the cold junction temperature, at varying ambient temperatures.

2. The thermocouple vacuum gauge of claim 1 wherein the thermocouple element comprises first and second crossing wires of different materials with a junction formed at their cross-over point, a heating transformer connected to two ends of a first one of the wires, a jumper connecting the two ends of the second wire and means connecting the two ends of said second wire to a voltmeter to provide parallel thermocouples and said heating means.

3. The thermocouple vacuum gauge of claim 2 wherein said thermistor is connected between said second wire and said voltmeter.

4. A thermocouple vacuum gauge comprising first and second crossed wires of different material with a welded junction, means for providing an electrical alternating current connected to the ends cf a first one of said wires, said means being the secondary winding of a transformer, a mid-tap on said secondary winding connected to one end of the second wire via a voltmeter.

5. The thermocouple vacuum gauge of claim 4 further comprising a jumper wire connecting the two ends of said second wire whereby said crossed wires are effective to act as parallel thermocouples with said first wire constituting a heater therefor.

6. The thermocouple vacuum gauge of claim 5 with negative coefficient thermistor means in series with said voltmeter between said mid-tap and said second wire end.

References Cited

UNITED STATES PATENTS

| 2,745,283 | 5/1956 | Hastings | 73—204 |
| 2,769,340 | 11/1956 | Bernreuter et al. | 73—361 |
| 1,228,803 | 6/1917 | Mertelmeyer | 73—361 |
| 1,381,450 | 6/1921 | Butterfield | 73—399 |
| 1,506,003 | 8/1924 | Kambayashi | 73—399 |
| 2,878,669 | 3/1959 | Knudson et al. | 73—15 |

LOUIS R. PRINCE, *Primary Examiner.*

DONALD O. WOODIEL, *Assistant Examiner.*